(12) United States Patent
Lewis et al.

(10) Patent No.: US 6,186,733 B1
(45) Date of Patent: Feb. 13, 2001

(54) LOW FLOOR VEHICLE RAMP ASSEMBLY

(75) Inventors: Cleatus A. Lewis, Modesto; Alan R. Cohn, Lockeford, both of CA (US)

(73) Assignee: Lift-U, Division of Hogan Mfg., Inc., Escalon, CA (US)

(*) Notice: Under 35 U.S.C. 154(b), the term of this patent shall be extended for 0 days.

(21) Appl. No.: 09/060,948

(22) Filed: Apr. 15, 1998

(51) Int. Cl.[7] .................................................. B60P 1/00
(52) U.S. Cl. .............................................. 414/537; 414/921
(58) Field of Search .................................... 414/522, 537, 414/558, 921; 14/71.1

(56) References Cited

U.S. PATENT DOCUMENTS

| | | | |
|---|---|---|---|
| 4,078,678 | * | 3/1978 | Tordella ............................. 414/537 |
| 4,131,209 | * | 12/1978 | Manning ......................... 414/522 X |
| 4,294,571 | * | 10/1981 | Tordella ............................. 414/537 |
| 4,325,668 | | 4/1982 | Julian et al. . |
| 4,339,224 | | 7/1982 | Lamb . |
| 4,466,771 | | 8/1984 | Thorley et al. . |
| 4,685,857 | | 8/1987 | Goeser et al. . |
| 4,685,858 | * | 8/1987 | Manning et al. ................... 414/537 |
| 4,759,682 | | 7/1988 | Hood . |
| 4,827,548 | * | 5/1989 | Hood ............................. 414/921 X |
| 4,845,792 | | 7/1989 | Bakula et al. . |
| 4,850,788 | | 7/1989 | Dickson . |
| 4,900,217 | * | 2/1990 | Nelson ............................... 414/537 |
| 5,160,236 | * | 11/1992 | Redding et al. ..................... 414/537 |
| 5,257,894 | | 11/1993 | Grant . |
| 5,259,081 | | 11/1993 | Henderson . |
| 5,284,414 | | 2/1994 | Kempf . |
| 5,299,904 | | 4/1994 | Simon et al. . |
| 5,305,486 | | 4/1994 | Smith et al. . |
| 5,357,869 | * | 10/1994 | Barjolle et al. ................. 414/921 X |
| 5,380,144 | | 1/1995 | Smith et al. . |
| 5,391,041 | | 2/1995 | Stanbury et al. . |
| 5,393,192 | | 2/1995 | Hall et al. . |
| 5,433,580 | | 7/1995 | Kempf . |
| 5,472,306 | * | 12/1995 | Stoll et al. ........................... 414/537 |
| 5,636,399 | | 6/1997 | Tremblay et al. . |
| 5,832,555 | * | 10/1998 | Saucier et al. ................. 414/537 X |

FOREIGN PATENT DOCUMENTS

| | | |
|---|---|---|
| 374 154 | 3/1984 | (AU) . |
| 42 34 064 A1 | 5/1993 | (DE) . |
| WO 99/12506 | 3/1999 | (WO) . |

* cited by examiner

Primary Examiner—James W. Keenan
(74) Attorney, Agent, or Firm—Christensen O'Connor Johnson Kindness PLLC

(57) ABSTRACT

A ramp assembly (20) for mounting in a low floor bus (22) or other vehicle. The ramp assembly (20) includes a rectangular enclosure (24) that fits underneath the chassis of the low floor bus (22). The ramp assembly (20) includes a reciprocating mechanism (26) for moving a ramp platform (28) between a fully deployed position and a fully stowed position. During this movement, the reciprocating mechanism (26) raises the trailing end of the ramp platform (28) in one translational movement with the extension of the ramp platform, such that the trailing end of the ramp platform, when deployed, is raised to the floor level of the low floor bus (22).

25 Claims, 15 Drawing Sheets

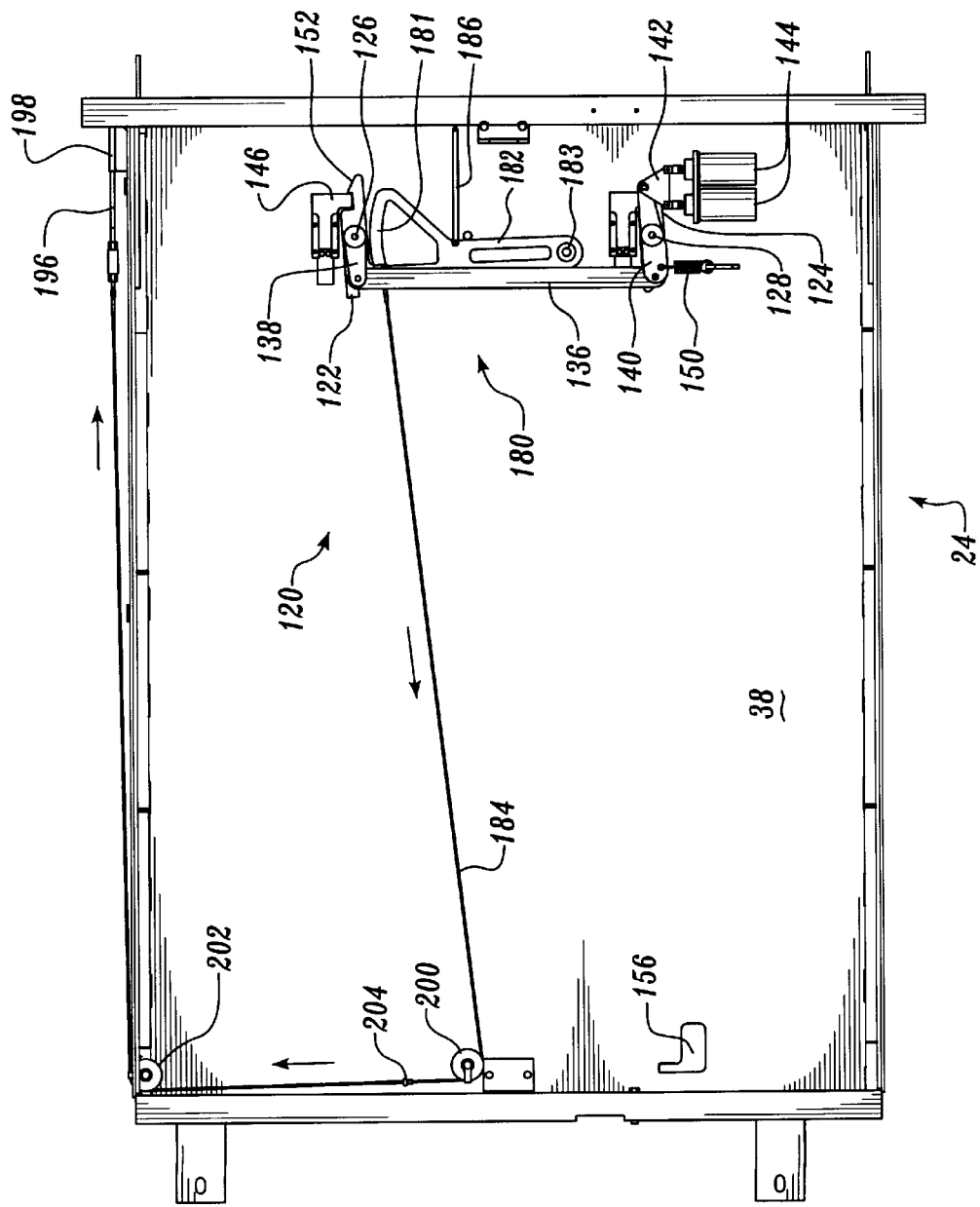

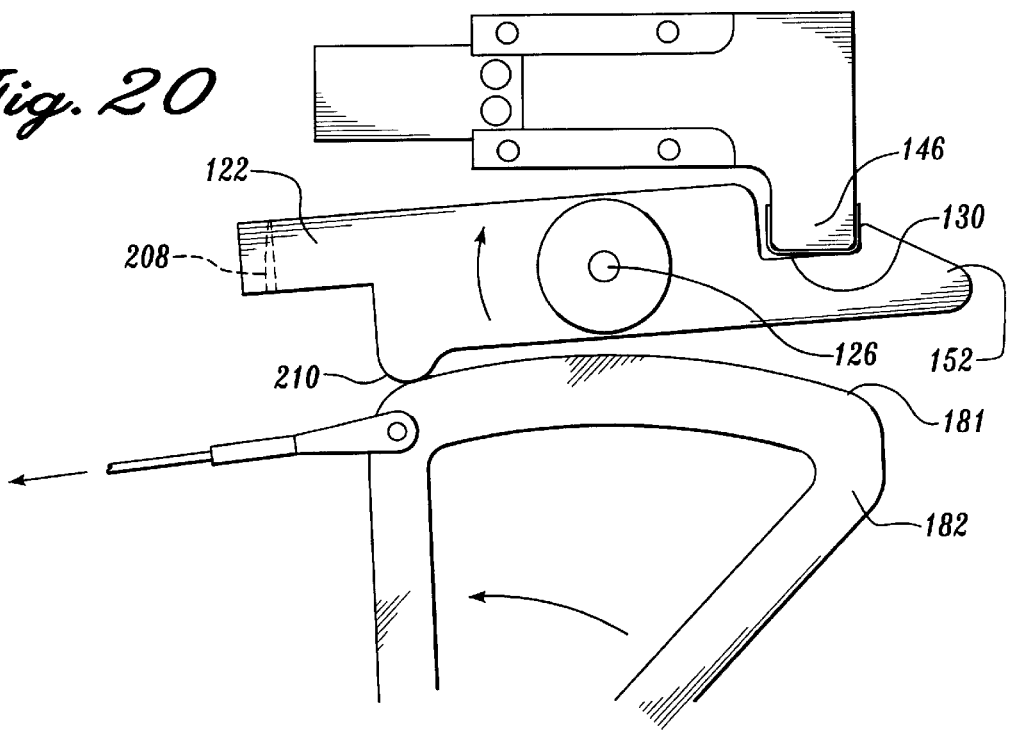
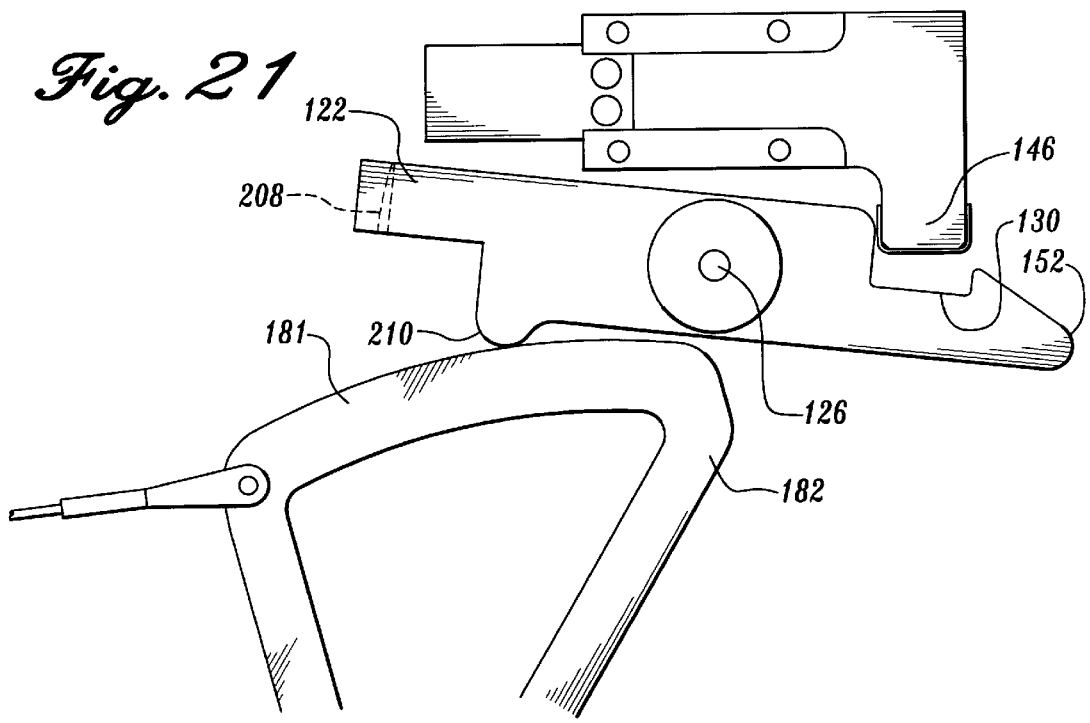

LOW FLOOR VEHICLE RAMP ASSEMBLY

TECHNICAL FIELD OF THE INVENTION

This invention relates generally to retractable ramp platforms that facilitate boarding of a passenger onto a vehicle and, in particular, retractable ramp platforms that facilitate access to a low floor vehicle.

BACKGROUND OF THE INVENTION

Intra-city buses have included wheelchair lifts for transporting persons of limited mobility in and out of the vehicles. Typically, a prior art wheelchair lift included a mechanically driven platform to raise and lower a passenger between loading from outside of the vehicle at ground level and entry into the vehicle at a vehicle floor level. For example, wheelchair lifts of the type installed in the stairwell of transit vehicles, such as intra-city buses, have been used for some time. One type of prior art wheelchair lift, commonly referred to as a "step lift" was disclosed in U.S. Pat. No. 4,466,771 to Thorley et al. The step lift in Thorley et al. was designed to be installed in the stairwell of a transit vehicle, and included hinged panels that were movable between a step configuration and a platform configuration. In the step configuration, the hinged panels formed steps for use by passengers to board and exit the vehicle. In the platform configuration, the hinged panels formed a horizontal platform used to raise and lower a wheelchair passenger between a vehicle floor-level position and a ground-level position.

Municipalities recently began using "low floor buses." In this style of bus, a passenger entered the bus at a level that was above ground by a sufficient amount so that the chassis had proper ground clearance. The floor of the bus throughout the vehicle was substantially at this level. It was believed that such buses were more stable in operation, and permitted simpler egress and ingress of passengers.

A problem encountered with the low floor buses was that wheelchair lifts such as were disclosed in Thorley et al. could not be installed in the buses because there was not a stairwell. Moreover, the low floor buses lacked sufficient under-chassis space to mount the complex lifting mechanisms for a wheelchair lift. Therefore, other systems had to be developed to accommodate wheelchair users and other passengers of limited mobility. To address these concerns, some manufacturers developed ramp assemblies for providing limited mobility passengers access into and out of the low floor buses. The ramp assemblies were structures that selectively provided a ramp platform that extended between the outside ground and the floor of a vehicle such as an intra-city bus to provide access into and out of the vehicle.

Prior art ramp assemblies typically stowed the ramp platform under the vehicles when not in use, and deployed the ramp platform when it was necessary to provide passenger access. When the ramp platform was deployed, the two ends were positioned at different heights, creating a slope upward from the ground to the bus floor. An example of a ramp assembly for use in a low floor bus was disclosed in U.S. Pat. No. 5,636,399 to Tremblay et al. A similar ramp assembly for use in a van was disclosed in U.S. Pat. No. 5,393,192 to Hall et al.

One of the problems found in designing prior art ramp assemblies for low floor vehicles was the limited amount of space allotted for the ramp platform and its reciprocating mechanism, including the motor and necessary drive mechanism. Because the low floor buses lacked a stairwell and a raised floor under which the ramp assembly could be mounted, the designer was forced to minimize size in all dimensions to prevent loss of ground clearance or interference with other under-chassis structures. Tremblay et al. and Hall et al. addressed this problem by providing a compact ramp assembly. However, while the ramp assemblies disclosed in Tremblay et al. and Hall et al. were relatively small, the motors used for the ramps were mounted behind or underneath the frame for the ramp assembly, requiring additional installation area underneath the vehicle. There exists a need for a more efficient manner of mounting a motor for a ramp assembly.

Another problem with the prior art ramp assemblies was that the ramp platform was stowed several inches below the floor level and, to reach the deployed position, had to be raised to extend between the floor and the ground. Alternatively, some form of transition between the ramp in the deployed position and the floor had to be provided. Tremblay et al. addressed this problem by providing a hinged panel that formed a transition between the floor and the ramp platform. Hall et al., on the other hand, provided a complex tilting mechanism utilizing a reciprocating motor to lift the trailing end of the ramp to floor level. There is a need for a less complex mechanism for providing a transition between the floor and a ramp platform.

Another problem with prior art ramp assemblies is that, if power was cut to the reciprocating mechanism for the ramp platform, the ramp platform may be stuck in a deployed position. In such case, the driver of the bus would have to wait for maintenance crews to repair, or at least stow, the ramp platform. There is a need for a more simple way of retracting a ramp platform when the reciprocating mechanism for the ramp platform is inoperable.

SUMMARY OF THE INVENTION

The present invention solves many of the above problems by providing a novel ramp assembly for mounting on a vehicle. In accordance with one embodiment of the invention, the ramp assembly includes a frame for mounting below a floor of a vehicle and a ramp platform mounted in the frame. A reciprocating mechanism is provided for extending and retracting the ramp platform along a length of the frame between stowed and deployed positions. The ramp platform is stowed substantially along a plane, and is arranged when deployed such that the forward end of the ramp platform extends down toward the ground. The ramp platform includes means connected to the reciprocating mechanism for raising the trailing end of the ramp platform in one translational movement with the extension of the ramp platform, such that the trailing end of the ramp platform, when deployed, is raised above the plane.

In one embodiment, the means for raising includes a lever having a distal end attached to the trailing end of the ramp platform and a second end rotatably attached to the reciprocating mechanism. The lever is configured to rotate about the second end as the reciprocating mechanism is extended, thereby lifting the trailing end upward.

In a preferred embodiment, the frame includes an abutment surface that is engaged by the lever when the ramp platform is extended, the engagement of the abutment surface by the lever causing the lever to rotate. The abutment surface is preferably a pin, which is engaged by a slot on the lever when the ramp platform is extended. The slot is preferably curved, such that the curved slot causes a smooth translational lifting movement of the trailing end.

In accordance with one aspect of the invention, the frame includes a cam slot and the lever includes a cam follower, the cam slot and the cam follower being configured such that during extension of the ramp platform, the cam follower follows the cam slot and the lever engages the pin and the cam follower continues forward such that the lever is rotated to lift the trailing end of the ramp platform.

In accordance with another aspect of the invention, the reciprocating mechanism includes a motor. The motor is mounted for reciprocating movement with the ramp platform.

In yet another embodiment, a rod extends the length of the frame, and a power cord for supplying power to the motor is coiled around the rod and is attached at one end to the frame and at another end to the reciprocating mechanism.

In accordance with other aspects of the invention, a first locking mechanism is provided that locks the ramp platform into a fully deployed position, and a second locking mechanism is provided that locks the ramp platform into a fully stowed position. Actuation of a single manual release mechanism releases the first locking mechanism when the ramp assembly is in the fully deployed position and releases the second locking mechanism when the ramp platform is in the fully stowed position.

The first locking mechanism preferably includes a first latch arm operatively associated with the reciprocating mechanism to extend and retract with the ramp platform and a first latch plate attached to the frame that is engaged by the first latch arm when the ramp platform is in the fully deployed position. A second latch arm can be operatively associated with the reciprocating mechanism to extend and retract with the ramp platform that engages a second latch plate attached to the frame when the ramp platform is in the fully deployed position. The first locking mechanism is further associated with the second locking mechanism by means of a coupling arm, causing both first and second locking mechanisms to operate substantially simultaneously when actuated. The second locking mechanism preferably includes a third latch plate attached to the frame that is engaged by the second latch arm when the ramp platform is in the fully stowed position.

The single manual release mechanism preferably includes a handle (1) operatively associated with the first latch arm when the ramp platform is in the deployed position such that actuation of the handle causes both the first and second latch arms to release the first and second latch plates, and (2) operatively associated with the second latch arm when the ramp platform is in the stowed position such that actuation of the handle causes the second latch arm to release the third latch plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 19 is a top plan view of the ramp assembly of FIG. 2, showing the latching mechanism of the present invention, with the rectangular motor plate and the ramp platform removed for detail, and the ramp assembly in the deployed position;

FIG. 20 is a detail view of the first latch plate of the latching mechanism of FIG. 19, with the latch pivot arms and the coupling arm removed for detail;

FIG. 21 is a detail view of the first latch plate of FIG. 20, with the latch arm manually actuated;

DETAILED DESCRIPTION OF THE PREFERRED EMBODIMENT

Figure 1:
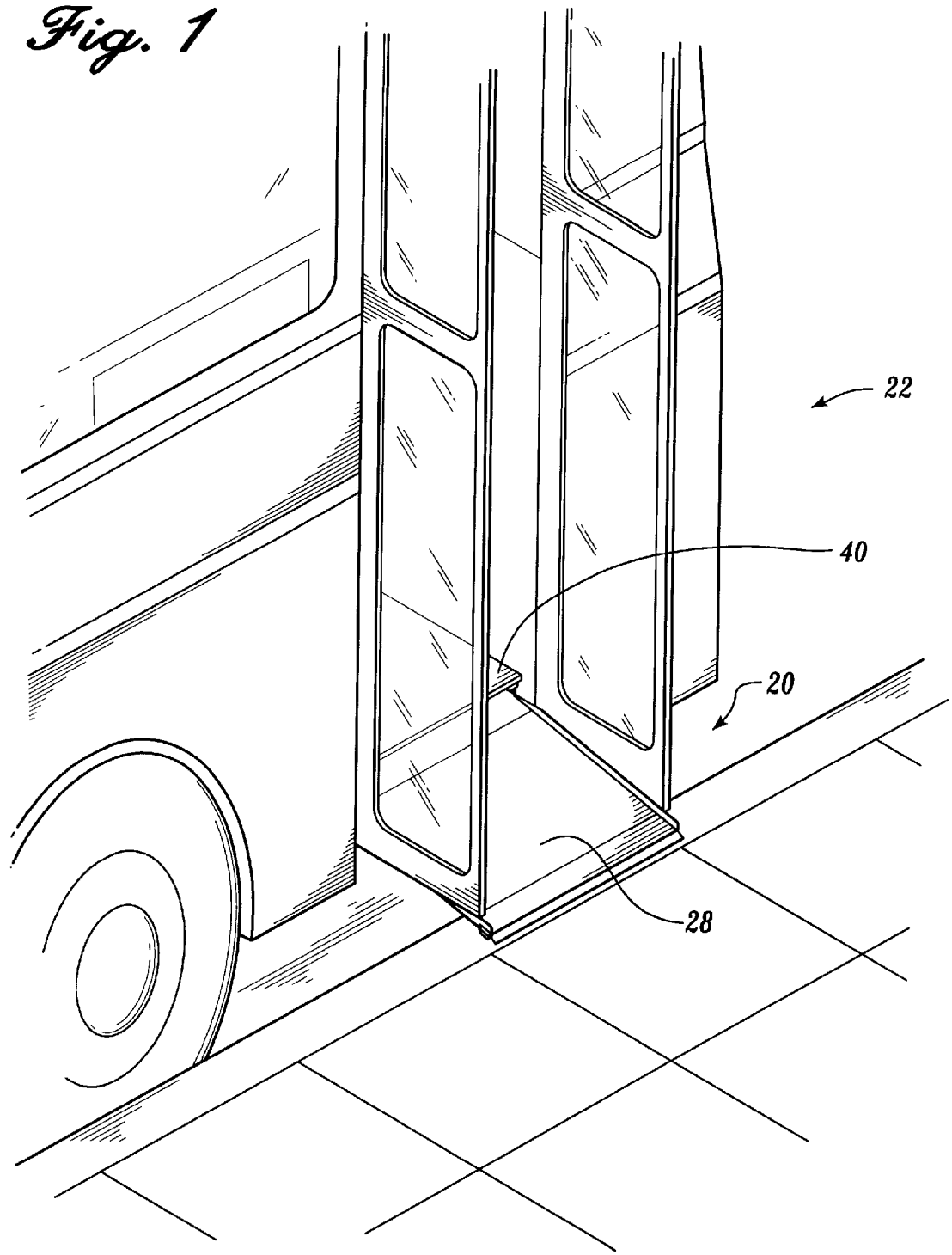
FIG. 1 is a partial side view of a low floor bus having a ramp assembly made in accordance with the present invention.
Figure 2:
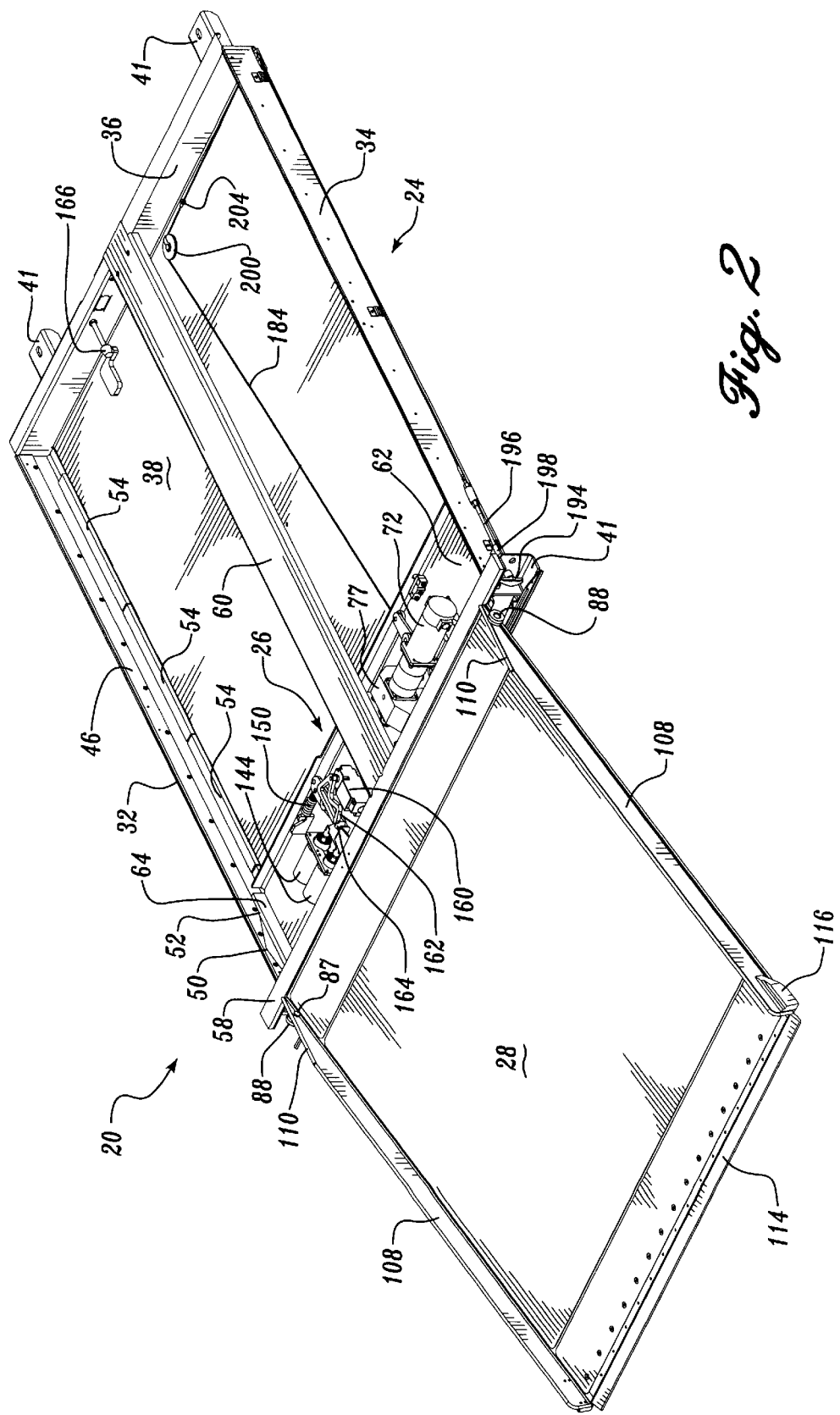
FIG. 2 is a front isometric view of the ramp assembly of FIG. 1, with the ramp assembly removed from the low floor bus, the ramp platform fully deployed, and the top panel removed for detail.

Referring now to the drawing, in which like reference numerals represent like parts throughout the several views, FIG. 2 shows a ramp assembly 20 for mounting in a low floor bus 22 (FIG. 1) or other vehicle. The ramp assembly 20 fits within a frame, in the drawings shown as a rectangular enclosure 24, that fits underneath the chassis of the low floor bus 22. The ramp assembly 20 includes a reciprocating mechanism 26 for moving a ramp platform 28 between a fully deployed position (FIG. 2) and a fully stowed position (FIG. 3).

Figure 3:
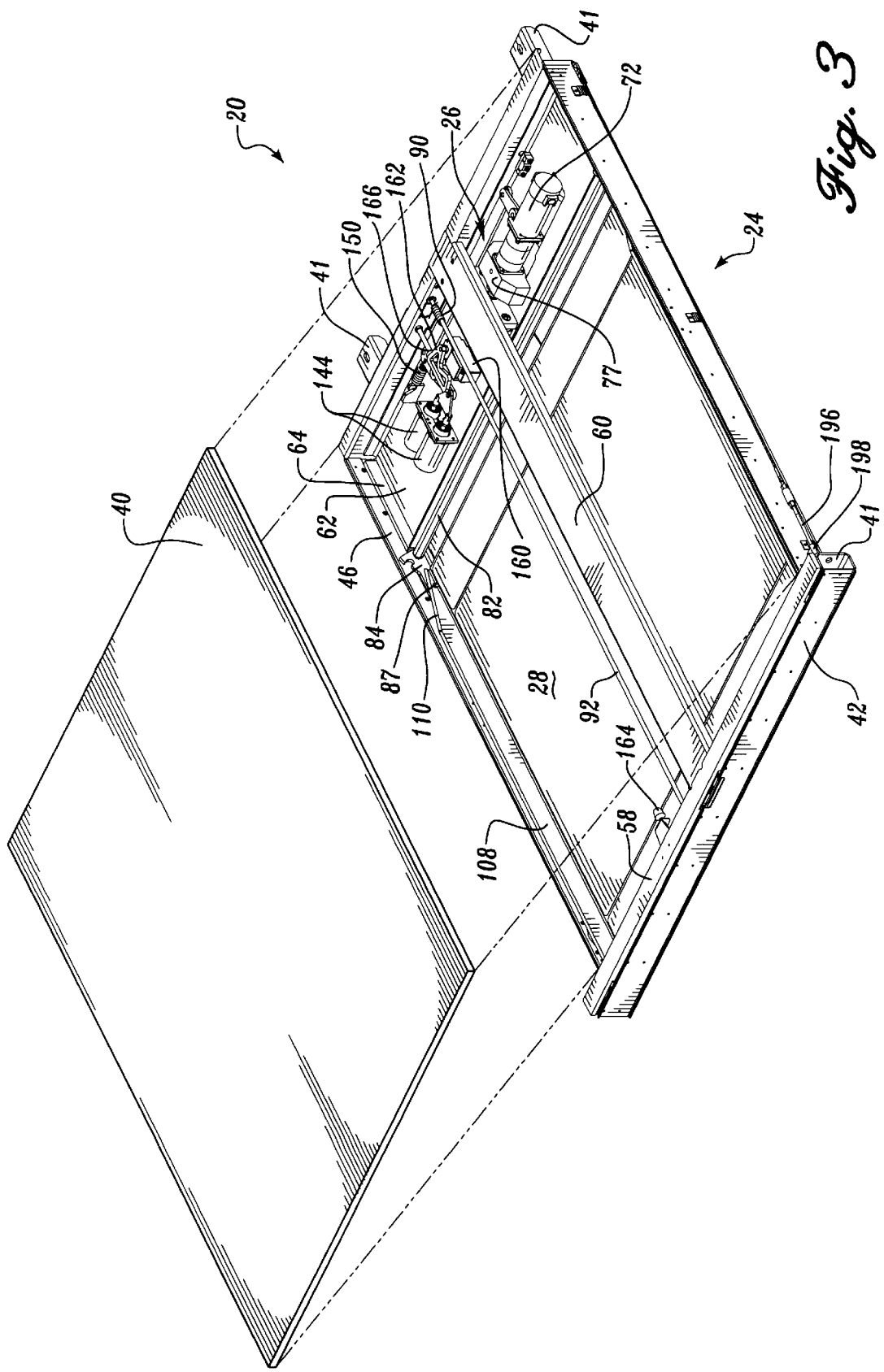
FIG. 3 is a front isometric view of the ramp assembly of FIG. 2, with the ramp platform fully stowed.

The rectangular enclosure 24 includes side panels 32, 34, an end panel 36, a bottom panel 38 and a removable top panel 40 (shown removed from and raised above the rectangular enclosure 24 in FIG. 3). The side panels 32, 34, the end panel 36, and the bottom panel 38 are a weldment that provides a structural frame to house the ramp platform 28 and the reciprocating mechanism 26 along the plane of the rectangular enclosure 24. Preferably, the side panels 32, 34 include bottom flanges (not shown) that provide structural support for the bottom panel 38. The top panel 40 functions as a cover for the rectangular enclosure 24 and, as described above, is removable. The rectangular enclosure 24 is attached below the doorway of the low floor bus 22 by brackets 41, welding or another method known in the art. When in place, the top panel 40 is located just below the floor of the doorway of the low floor bus 22 (FIG. 1).

Figure 8:
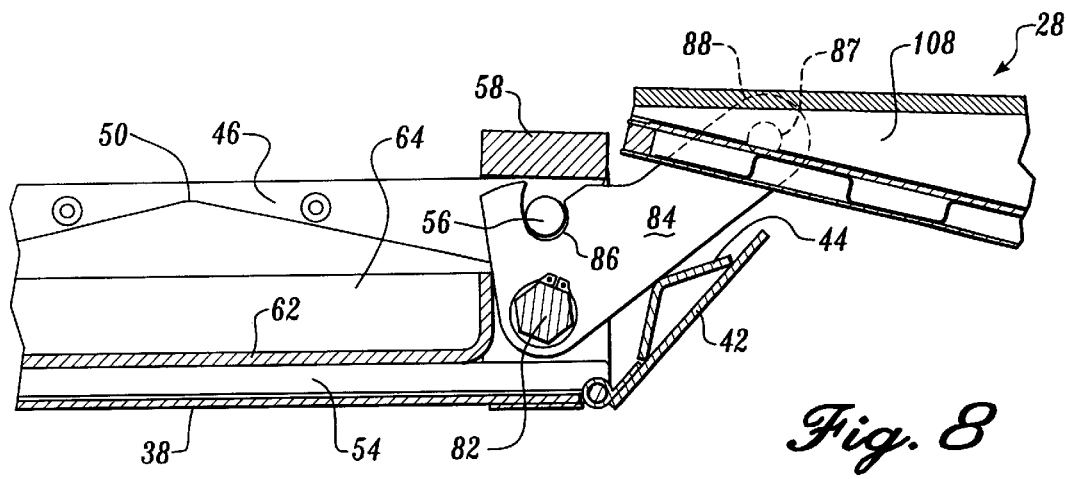
FIG. 8 is a partial sectional view taken along the section lines 6—6 of FIG. 5, with the rectangular motor plate and the ramp platform in position.

A hinged closure panel 42 (FIG. 3) is attached to the forward end of the rectangular enclosure 24 (opposite the end panel 36). The hinged closure panel 42 is hinged from the bottom panel 38 and is spring-loaded to the closed position. The hinged closure panel 42 includes V-shaped brackets 44 (FIG. 8) on its inner side, adjacent to the side panels 32, 34, and arranged so that the point of the V extends toward the end panel 36 when the hinged closure panel 42 is closed. As is described in detail below, the V-shaped brackets 44 are contacted by the ramp platform 28 at the beginning of deployment of the ramp platform so as to open the hinged closure panel 42.

Figure 6:
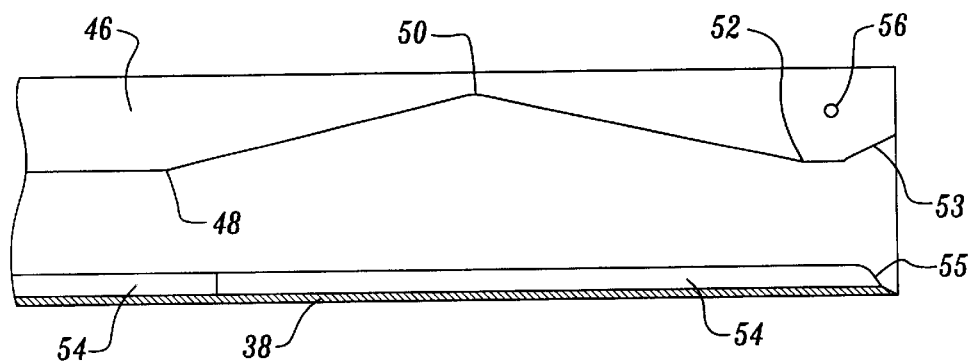
FIG. 6 is a sectional view of the rectangular enclosure for the ramp assembly of FIG. 1, taken along the sectional lines 6—6 of FIG. 5, with the rectangular motor plate and the ramp platform removed for detail.

FIG. 6 shows a side view of the inside of one of the side panels 34. The side panel 34 includes a guide bar 46 extending along an upper surface thereof. The outboard, or forward end of the guide bar 46 has a serpentine profile. Specifically, the guide bar 46 extends upward at a rear juncture 48 and continues upward to a peak 50 where the guide bar turns and extends downward to a forward juncture 52. Just forward of the forward juncture 52, the guide bar 46 tapers upward at a sloped front edge 53.

The outer edges of the bottom panel 38 include bottom flange support bearings 54 directly below the guide bars 46. The bottom flange support bearings 54 can rest on top of bottom flanges for the side panels 32, 34, if provided. The bottom flange support bearings 54 extend along the bottom panel 38 adjacent to the side panel 34 and underneath the guide bars 46, and are preferably manufactured from a low friction material such as Nylatron™ bearing material. The bottom flange support bearings 54 are preferably the same height along their lengths, with the exception of a tapered leading edge 55 (FIG. 6).

Cap screw heads, or pins 56 (FIG. 6), extend into the side panels 32, 34, and are located at the forward end of the rectangular enclosure 24 just above the forward juncture 52 of the guide bars 46. As described in detail below, the pins 56 act as abutment surfaces for rotating the trailing end of the ramp platform upward at the end of deployment of the ramp platform.

An upper cross-member 58 spans the width of the forward end of the rectangular enclosure 24. The upper cross-member 58 provides additional structural support for the rectangular enclosure 24, as well as threshold support for passenger foot traffic at the edge of the doorway for the low floor bus 22.

A structural channel 60 (FIG. 2) is located above the reciprocating mechanism 26 and the ramp platform 28, and is fixed between the rearward portion of the rectangular enclosure 24 (adjacent to the end panel 36) and the upper cross-member 58. The structural channel 60 provides longitudinal structure for the rectangular enclosure 24, as well as support for components of the reciprocating mechanism 26, as is described in detail below.

The reciprocating mechanism 26 includes a rectangular motor plate 62 having bearing strips 64 attached at its ends. The rectangular motor plate 62 is of sufficient length so as to rest on top of and run along the bottom flange support bearings 54 on opposite sides of the bottom panel 38. The bearing strips 64 are of sufficient height and shape to fit snugly between the guide bars 46, the rectangular motor plate 62, and the bottom flange support bearings 54. The bearing strips 64 are preferably manufactured from a low-friction material so that they freely slide along the top of the bottom flange support bearings 54 and bottom surface of the guide bars 46.

Figure 5:
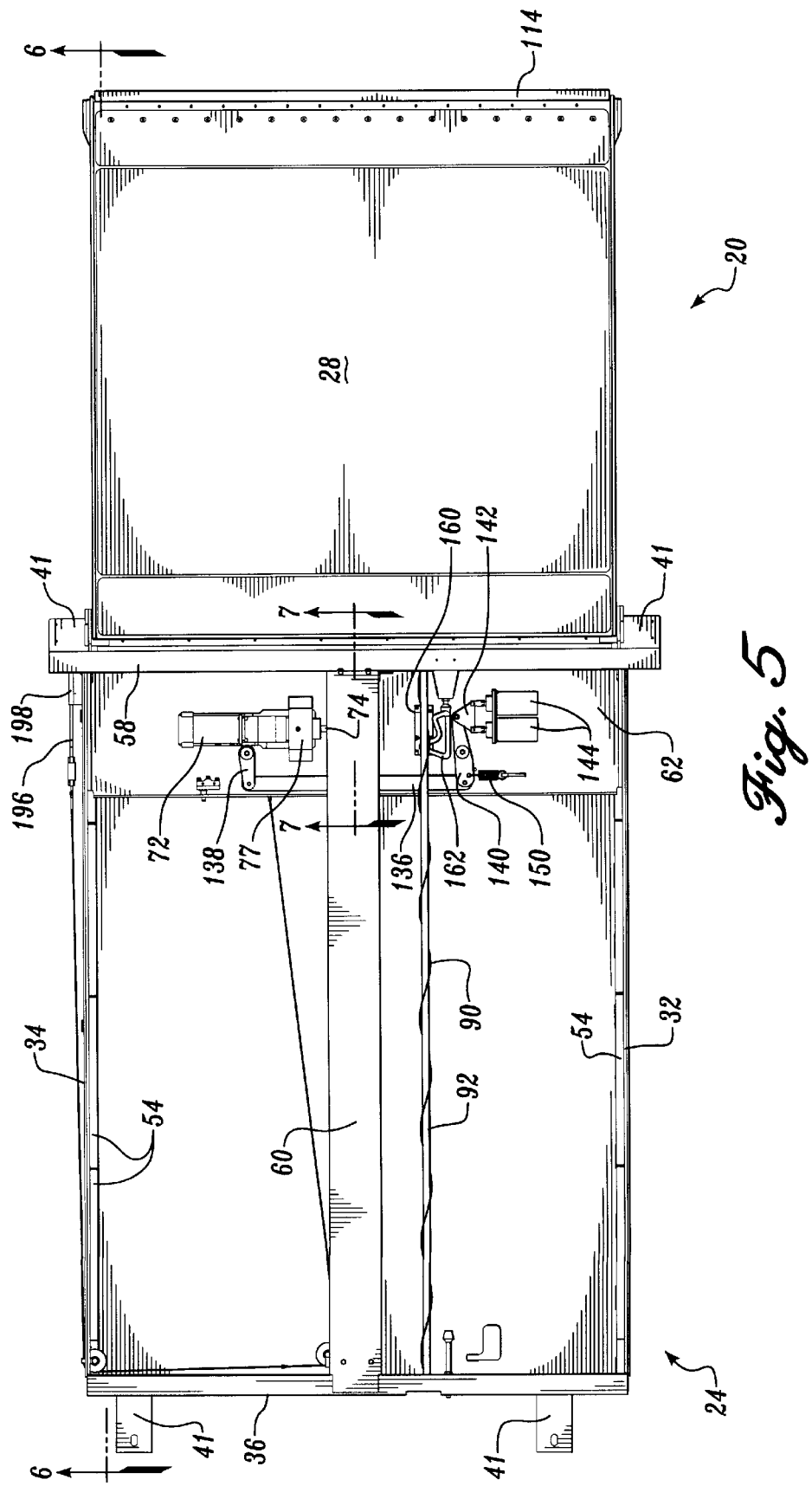
FIG. 5 is a top plan view of the ramp assembly of FIG. 2.

An electric motor 72 is attached to a motor mount 77, which is mounted on the rectangular motor plate 62 such that the motor extends lengthwise on the motor plate and such that a motor shaft (not shown) extending out of the electrical motor also extends lengthwise. A flexible coupling (not shown) connects the motor shaft to a drive shaft 74a (FIG. 5). Although the electric motor 72 is disclosed as being electric, it is to be understood that hydraulic, pneumatic, or other powered motors could be used. A drive pulley 76 (FIG. 7) is located on the drive shaft 74a. The drive shaft 74a is supported by bearings (not shown) pressed into a mounting plate 73 (FIG. 7) that is attached to the rectangular motor plate 62.

A pair of idler pulleys 78 (FIG. 7) are mounted on opposite sides of the drive pulley 76. The central axes of the idler pulleys 78 extend parallel to the central axis of the drive pulley 76. The idler pulleys 78 roll on stationary idler shafts 78a, using bearings (not shown).

Figure 7:
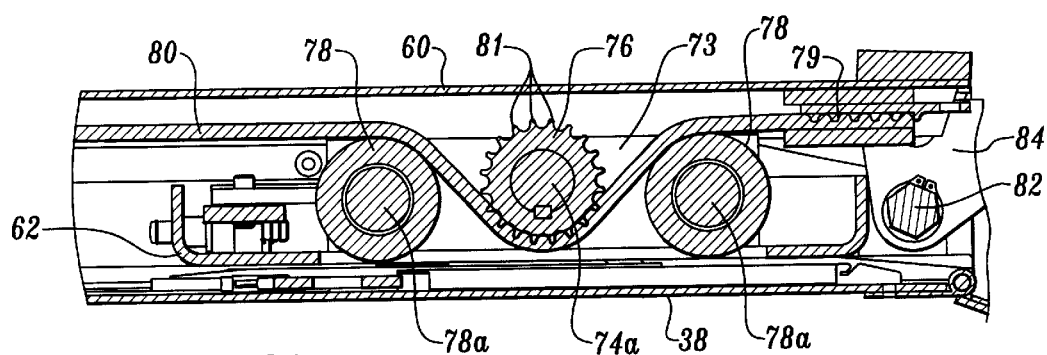
FIG. 7 is a partial sectional view taken along the sectional lines 7—7 of FIG. 5.

A drive belt 80 is fixed at both ends to opposite ends of the rectangular enclosure 24. The drive belt 80 includes ribs or holes (not shown) that are engaged by teeth 81 on the drive pulley 76 (FIG. 7). The drive belt 80 extends over both of the idler pulleys 78 and under the drive pulley 76, ensuring proper engagement of the drive belt 80 with the drive pulley 76. The forward end of the drive belt 80 is attached by a drive belt clamp 79 that is adjustable to tension the drive belt 80. The structural channel 60 provides support for the drive belt clamp 79, and serves as a cover for the drive belt 80.

Figure 4:
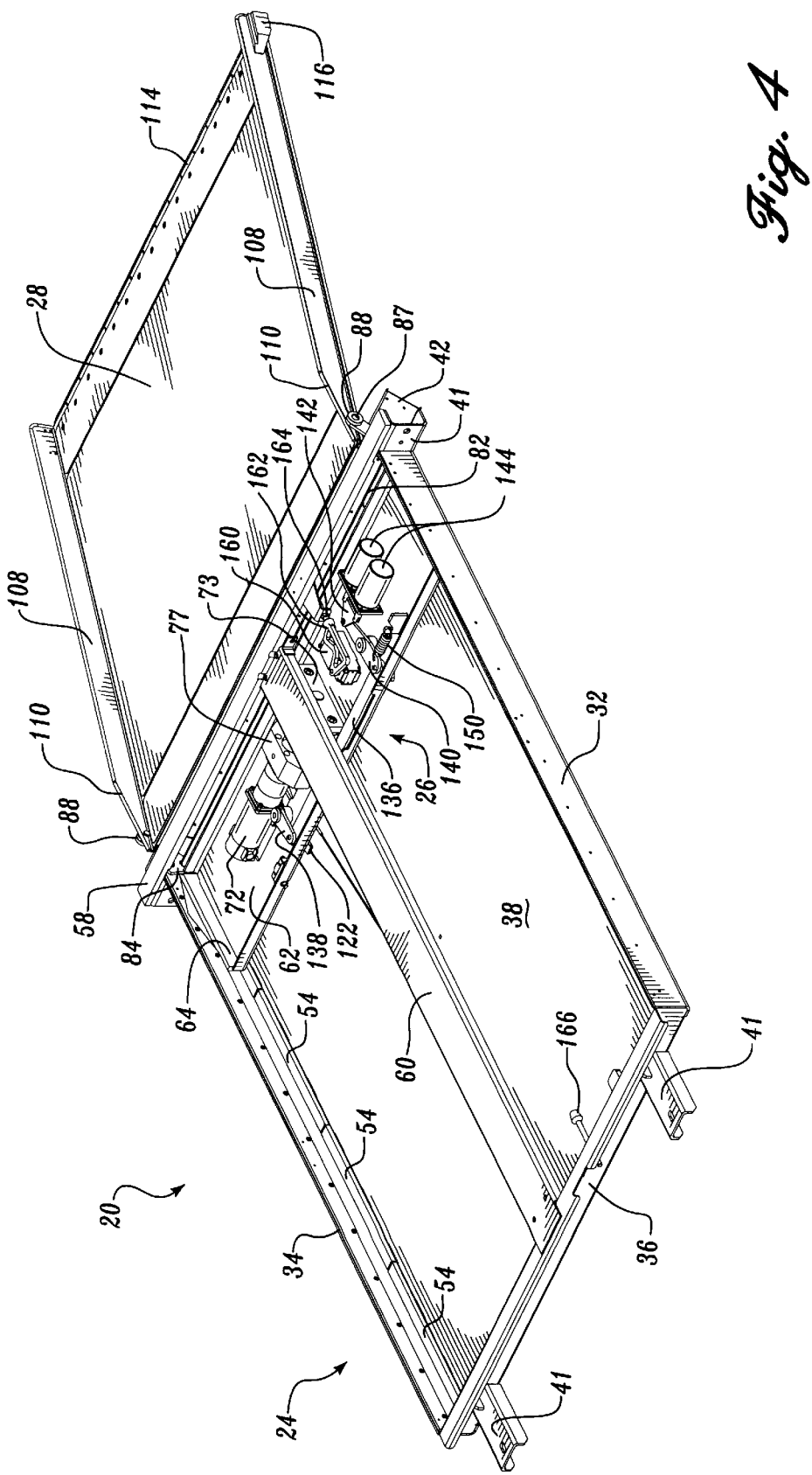
FIG. 4 is a rear isometric view of the ramp assembly of FIG. 2.

A torque shaft 82 (FIG. 3) extends along the forward edge of the rectangular motor plate 62 and is mounted for rotation in bores 64a in the forward end of the bearing strips 64. Lever arms 84 (FIG. 8) are mounted on opposite ends of the torque shaft 82 for rotation with the torque shaft. Each of the lever arms 84 is shaped like an elongate triangle with rounded edges. The pointed distal end of the elongate triangle faces forward, and the bottom opposite corner of the triangle is attached for rotation on the torque shaft 82. A curved slot 86 is located on the third corner of the triangle and faces upward. The triangular shape of the lever arm 84 causes the mouth of the curved slot 86 to face somewhat forward as well as upward. The pointed, forward end of each of the lever arms 84 is pivotally attached to trunnions 87 that are fixed to the sides of the ramp platform 28 near its rearward end (FIG. 4).

Each of the trunnions 87 includes a circular bearing 88 mounted thereon and attached to the associated lever arm 84.

The circular bearing 88 functions as a cam follower located between and influenced by the guide bars 46 and the bottom bearing flange support 54.

A coiled electrical cable 90 (FIGS. 3 and 5 only) supplies power to the electrical motor 72 and other electrical components on the rectangular motor plate 62. The coiled electrical cable 90 wraps around a rod 92 that extends the length of the upper portion of the rectangular enclosure 24. The coiled electrical cable 90 is configured much like an extension spring, such that as the rectangular motor plate 62 travels back and forth through its range of motion, the coiled electrical cable compresses in the stowed position (FIG. 3), and stretches the length of the rectangular enclosure 24 in the deployed position (FIG. 5). During this extension and retraction, the coiled electrical cable 90 is supported and guided by the rod 92, which prevents the coiled electrical cable from becoming entangled in the reciprocating mechanism 26. If different types of motors are used, power (such as hydraulic fluid) can be supplied by a similar coiled supply line.

Figure 10:
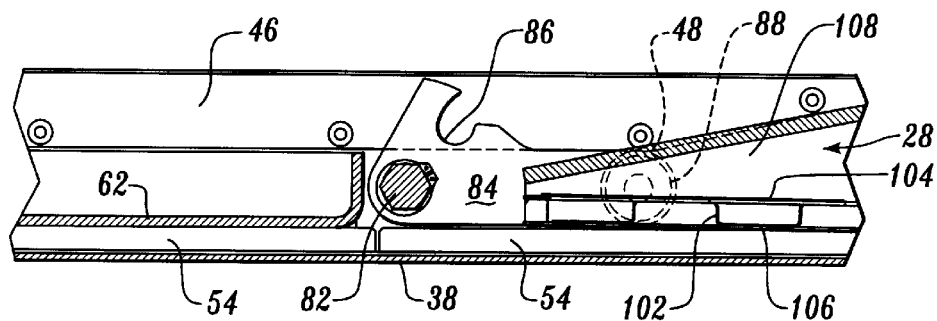
FIG. 10 is a partial sectional view similar to FIG. 8, with the ramp platform 14 inches retracted.

The ramp platform 28 is rectangular in shape and is of sufficient width to accommodate persons in wheelchairs and/or mobility aid devices. To minimize weight, the ramp platform 28 is preferably constructed of thin sheet metal having a corrugated sheet 102 (FIG. 10) extending between upper and lower sheets 104, 106. Alternatively, the ramp platform can be made of lightweight aluminum or a composite material of sufficient strength and stiffness to support the weight of passengers boarding the ramp platform 28. A non-skid material or other covering (not shown) can be used on the top surface of the ramp platform 28 to aid a passenger in loading the vehicle.

Stationary side curbs 108 extend along the outer edges of the ramp platform 28. The stationery side curbs 108 are preferably at least two inches in height, thereby preventing a wheelchair or a mobility aid device from rolling off of the sides of the ramp platform 28. The rearward, or inboard ends of the stationery side curbs 108 include bevels 110, which permit deployment of the ramp platform 28 without interference with the enclosure 24.

The ramp platform 28 includes a beveled leading edge 114 extending along the width of its forward end. The beveled leading edge 114 contacts the ground when the ramp platform 28 is fully deployed so as to provide a minimum threshold height when the wheels of a wheelchair roll onto the ramp platform.

Bearing blocks 116 are attached to the leading outside edges of the stationery side curbs 108. The bearing blocks 116 extend between the guide bars 46 and the bottom flange support bearings 54 when the ramp platform 28 is withdrawn to the stowed position. The bearing blocks 116 prevent the ramp platform 28 from rattling or bouncing within the enclosure as the vehicle travels down roadways.

Figure 22:
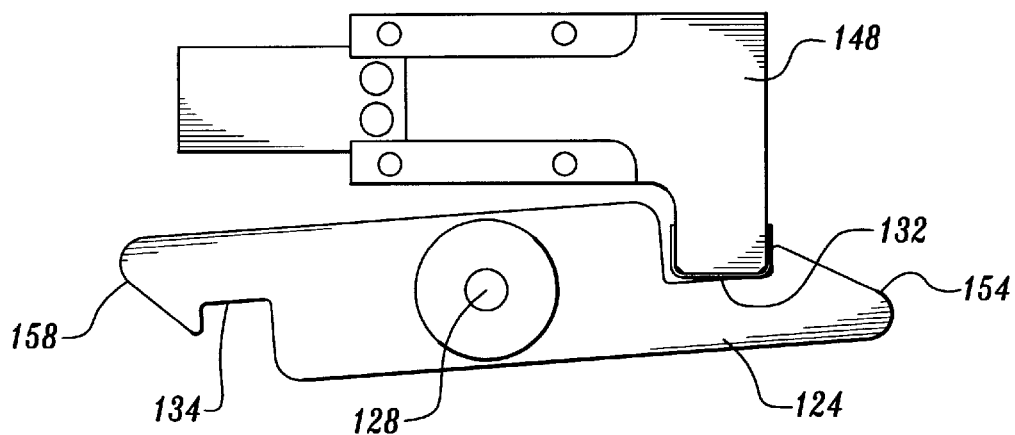
FIG. 22 is a detail view of the second latch plate of the latching mechanism of FIG. 19 with the latch pivot arms and the coupling arm removed for detail.

A latch mechanism 120 (FIGS. 19–28) is used to selectively hold the ramp platform 28 in the deployed or stowed positions. The latch mechanism 120 includes first and second latch arms 122, 124 (best shown in FIGS. 20 AND 22) extending underneath the rectangular motor plate 62 and pivotally mounted about their centers on pins 126, 128. The pins 126, 128 extend through orthogonal bores (not shown) in the left central and right central halves of the rectangular motor plate 62, respectively. Thus, the first and second latch arms 122, 124 travel with the rectangular motor plate 62 during extension and retraction of the ramp platform 28.

The first latch arm 122 includes a cutout 130 on the front, right end of the latch arm. The cutout 130 is spaced from the pin 126. The second latch arm 124 includes two cutouts 132, 134 located on opposite sides and on opposite ends of the second latch arm. Both of these cutouts 132, 134 are spaced from the pin 128.

Movement of the two latch arms 122, 124 is tied by a coupling arm 136, a short pivot arm 138, and a long pivot arm 140. The short pivot arm 138 is attached for rotation with the first latch arm 122 by the pin 126, and extends above the rectangular motor plate 62 parallel with the rearward portion of the first lever arm 122. The long pivot arm 140 is fixed for rotation with the second latch arm 124 by the pivot pin 128, and extends above the rectangular motor plate 62 parallel with the second latch arm 124. The coupling arm 136 is rotatably attached to the distal, rearward ends of the short pivot arm 138 and long pivot arm 140. The opposite end of the long pivot arm 140 is attached to the apex of a triangular plate 142. The base of the triangular plate 142 is attached to the actuating arms on a pair of solenoids 144.

Actuation of the solenoids 144 causes the long pivot arm 140 to rotate, which through the coupling arm 136 causes the short pivot arm 140 to rotate. Because the short pivot arm 138 is fixed for rotation with the latch arm 122, and the long pivot arm 140 is fixed for rotation with the latch arm 124, rotation of the short and long pivot arms 138, 140 causes a corresponding rotation of the latch arms 122, 124.

The cutout 130 in the latch arm 122 and the cutout 132 in the latch arm 124 are configured so as to extend over protrusions on deployed latch plates 146, 148 located at the forward end of the bottom panel 38. The deployed latch plates 146, 148 lie below the path of the rectangular motor plate 62 and the ramp platform 28.

Figure 23:
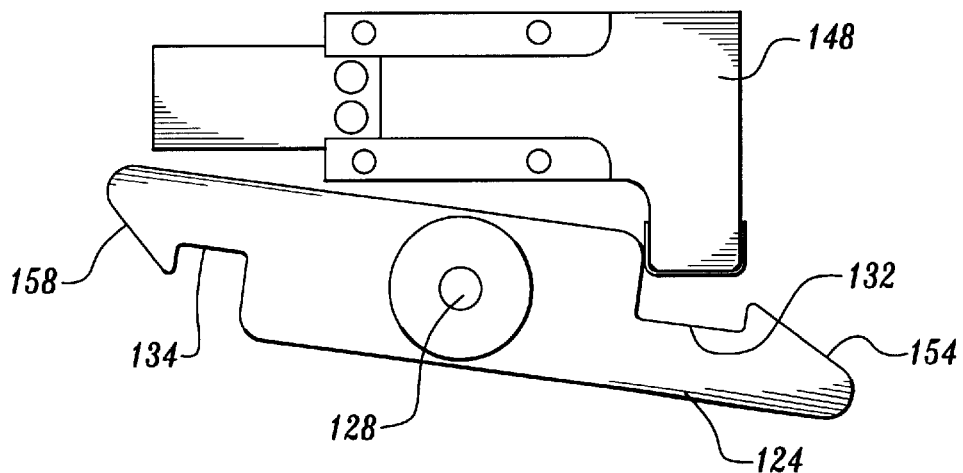
FIG. 23 is a detail view of the second latch plate of FIG. 20, with the latch arm manually actuated.

When the ramp platform 28 is fully deployed, the cutouts 130, 132 extend over the deployed latch plates 146, 148 (FIGS. 20 AND 24), preventing movement of the rectangular motor plate 62 and the ramp platform 28. In this manner, the latch mechanism 120 acts as a dual locking mechanism to hold the rectangular motor plate 62 and the ramp platform 28 in the deployed position. A spring 150 is attached to the rearward, distal end of the long pivot arm 140, and biases the latch arms 122, 124 toward counterclockwise rotation so that cutouts 130, 132 maintain locking engagement with the deployed latch plates 146, 148. To overcome this locking engagement, the solenoids 144 are actuated, causing the triangular plate 142 to retract and rotate the latch arms 122, 124 in the clockwise direction, thereby releasing the deployed latch plates 146, 148 from the cutouts 130, 132 (FIGS. 21 and 23).

The latch arms 122, 124 include rounded front ends having tapered leading sections 152, 154. The tapered leading sections 152, 154 cause the latch arms 122, 124 to engage and roll over the deployed latch plates 146, 148 as the rectangular motor plate 62 and the ramp platform 28 are extended to the deployed position. The tapered leading sections 152, 154 continue to rotate the latch arms 122, 124 until the cutouts 130, 132 snap into place onto the deployed latch plates 146, 148 when the ramp platform 28 is fully deployed.

The cutout 134 on the rearward end of the latch arm 124 is configured to fit over a stowed latch plate 156 at the rearward portion of the rectangular enclosure 24. The stowed latch plate 156 is located on the bottom panel 38, and is sized so as to fit under the rectangular motor plate 62 when the ramp platform 28 is stowed. The rearward edge of the second latch arm 124 includes a tapered trailing section 158 designed to engage and roll over the latch plate 156 during retraction of the ramp platform 28. Thus, the engagement of the cutout 134 with the stowed latch plate 156 acts as a locking mechanism to hold the ramp platform 28 and rectangular motor plate 62 in position when the ramp platform is in the stowed position.

Figure 9:
FIG. 9 is a sectional view similar to FIG. 6, with the rectangular motor plate and the ramp platform in position, and the ramp platform fully stowed.

In use, the low floor bus 22 reaches a destination and the ramp platform 28 is deployed. During travel, the ramp platform 28 is maintained in the stowed position (FIG. 9), and is held in place by the contact of the cutout 134 of the second latch arm 124 on the stowed latch plate 156. To deploy the ramp platform 28, the driver of the low floor bus 22 presses a deploy switch (not shown), which actuates the solenoids 144, releasing the cutout 134 from the stowed latch plate 156. Then, the electric motor 72 is powered causing the drive pulley 76 to rotate. Rotation of the drive pulley 76 causes the drive pulley 76 to move along the drive belt 80, advancing the rectangular motor plate 62 and the ramp platform 28 within the rectangular enclosure 24. At the beginning of this movement, the leading end of the ramp platform 28 engages the V-shaped bracket 44 on the hinged closure panel 42, causing the hinged closure panel to swing downward and expose the inside of the rectangular enclosure 24. During the beginning of extension of the ramp platform 28 and the rectangular motor plate 62, the bearing blocks 116 move along and between the guide bars 46 and the bottom flange support bearings 54. The bearing blocks 116 extend beyond the end of the guide bars 46 and the bottom flange support bearings 54 after a short extension of the ramp platform 28.

During extension of the ramp platform 28 and the rectangular motor plate 62, the bearing strips 64 on the outer edges of the rectangular motor plate are guided below the lower surface of guide bars 46, and ride along the upper surface of the bottom flange support bearings 54. In addition, the outer edges of the rectangular motor plate 62 and the outer side edges of the ramp platform 28 ride along the upper surface of the bottom flange support bearings 54. The circular bearings 88 are trapped between the bottom flange support bearings 54 and the guide bars 46 during this extension.

As the ramp platform 28 extends outward and more than half of the ramp platform extends out of the rectangular enclosure 24, the weight of the forward end of the ramp platform cantilevers the rearward end of the ramp platform upward around the tapered leading edge 55 of the bottom flange support bearings 54, pressing the circular bearing 88 upward against the lower surface of the guide bars 46. The serpentine profile of the lower edge of the guide bars 46 causes the circular bearings 88 to act as cam followers that engage and are influenced by the serpentine profile to control the ramp platform's angle with respect to the rectangular enclosure 24.

Figure 11:
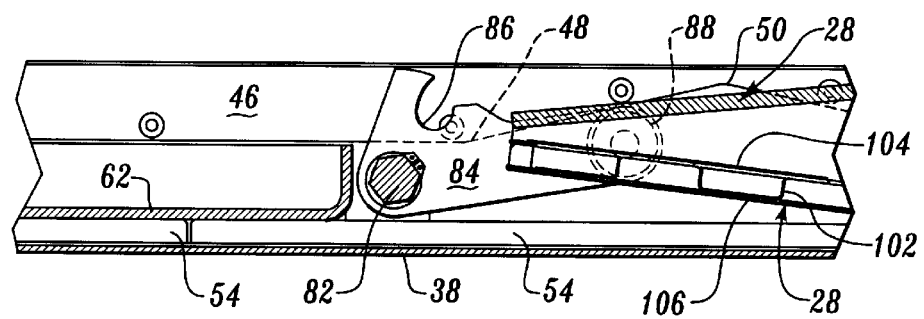
FIG. 11 is a partial sectional view similar to FIG. 8, with the ramp platform 11 inches retracted.

As the circular bearings 88 reach the rear junctures 48 of the guide bars 46 (FIG. 10), the circular bearings begin an upward climb toward the peak 50 of the guide bars. The torque shaft 82, however, remains adjacent to the bottom flange support bearings 54 because the torque shaft is attached to the bearing strips 64, which are confined from movement upward by the lower surface of the guide bars 46. Thus, the lever arms 84 rotate about the torque shaft 82 so that the curved slots 86 extend almost straight upward relative to the rectangular motor plate 62 (FIG. 11).

Figure 12:
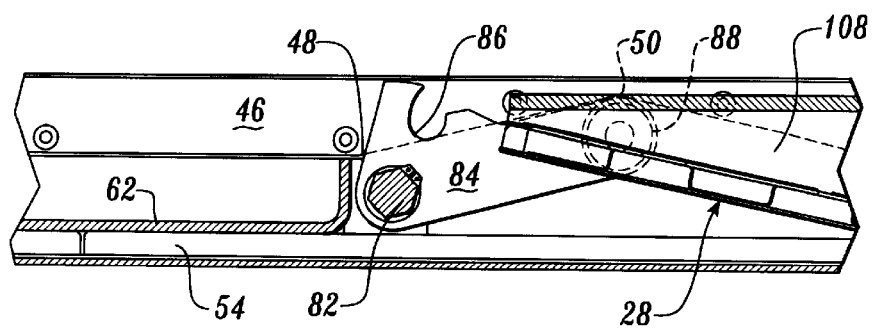
FIG. 12 is a partial sectional view similar to FIG. 8, with the ramp platform 9 inches retracted.
Figure 13:
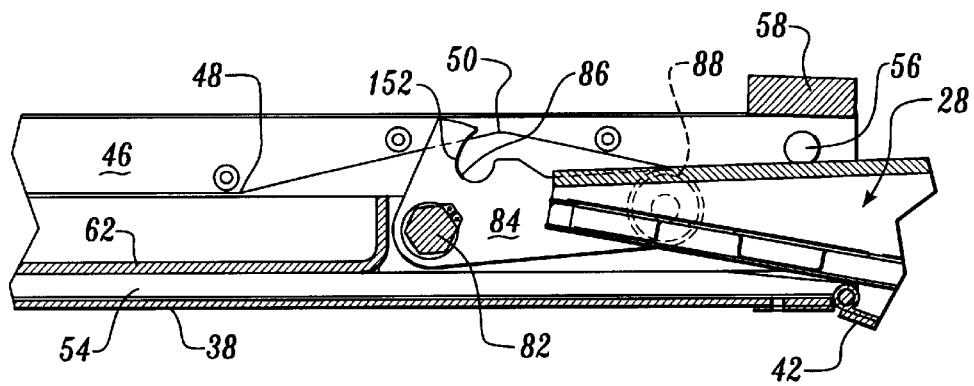
FIG. 13 is a partial sectional view similar to FIG. 8, with the ramp platform 6 inches retracted.
Figure 14:
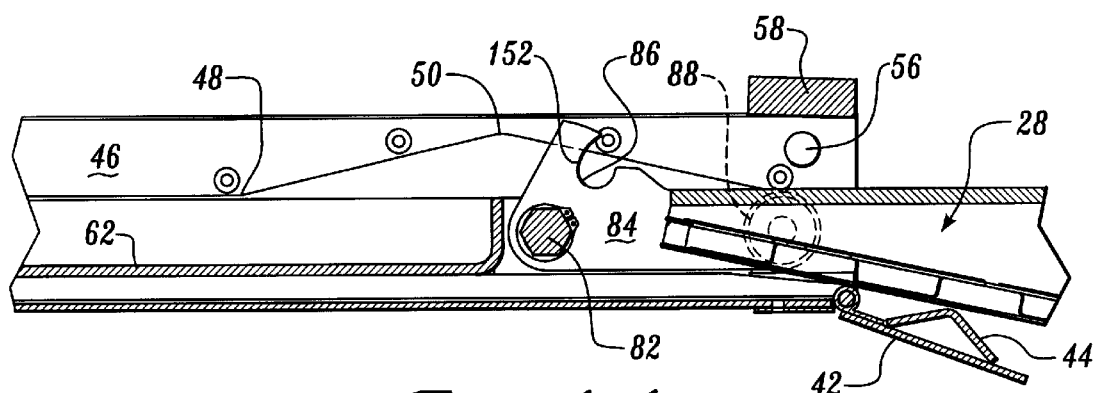
FIG. 14 is a partial sectional view similar to FIG. 8, with the ramp platform 4 inches retracted.

After the circular bearings 88 have reached to the peaks 50 FIG. 12), the circular bearings begin a downward motion (FIG. 13) toward the forward junctures 52 (FIG. 14). When the circular bearings 88 reach the peaks 50, the angle of the ramp platform 28 with the bottom panel 38 is the same as the angle of the section of the guide bars 46 between the peak 50 and forward juncture 52 with the bottom panel. Thus, as the circular bearings 88 move downward toward the forward junctures 52, the ramp platform 28 extends in a linear manner along an angle which is equal to the lower surface of the guide bars 46.

Figure 15:
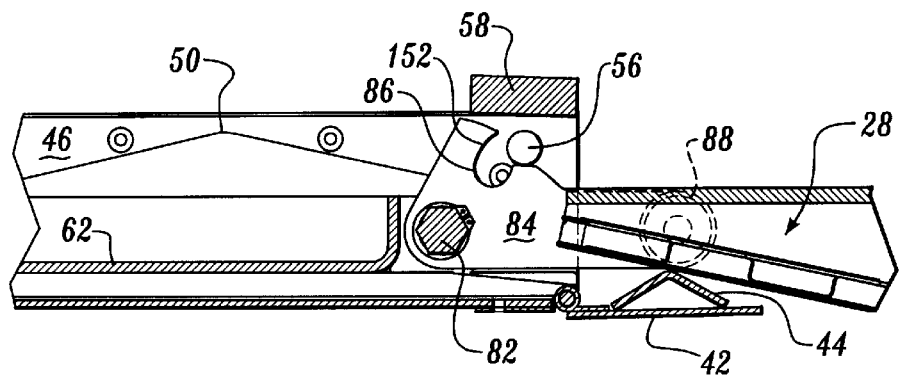
FIG. 15 is a partial sectional view similar to FIG. 8, with the ramp platform 1¼ inch retracted.
Figure 16:
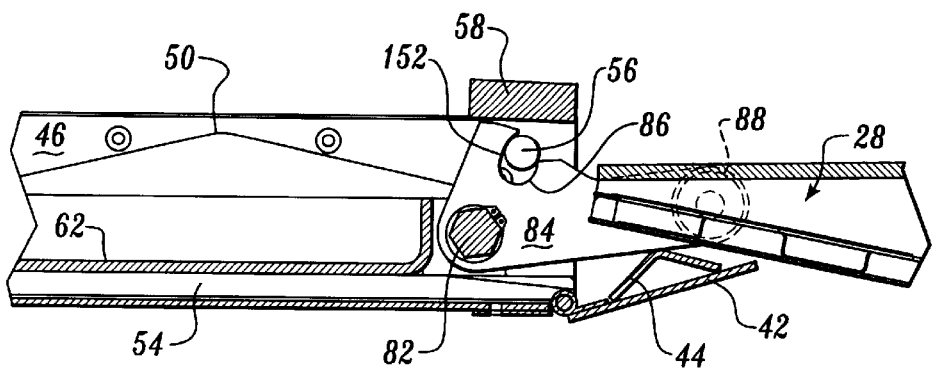
FIG. 16 is a partial sectional view similar to FIG. 8, with the ramp platform ¾ inch retracted.
Figure 17:
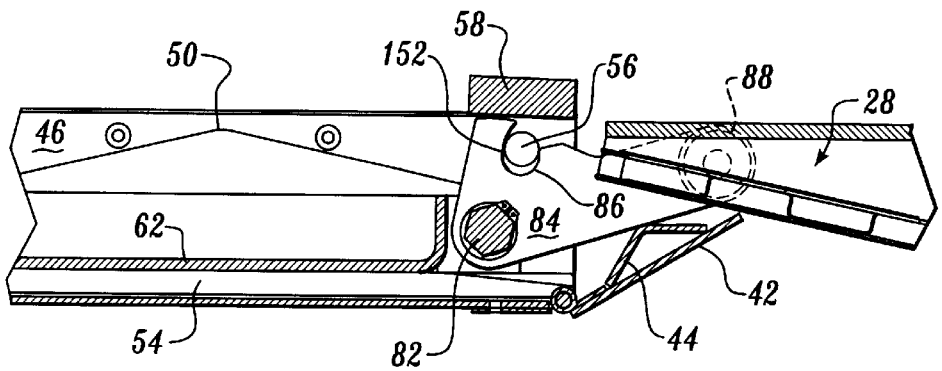
FIG. 17 is a partial sectional view similar to FIG. 8, with the ramp platform ½ inch retracted.
Figure 18:
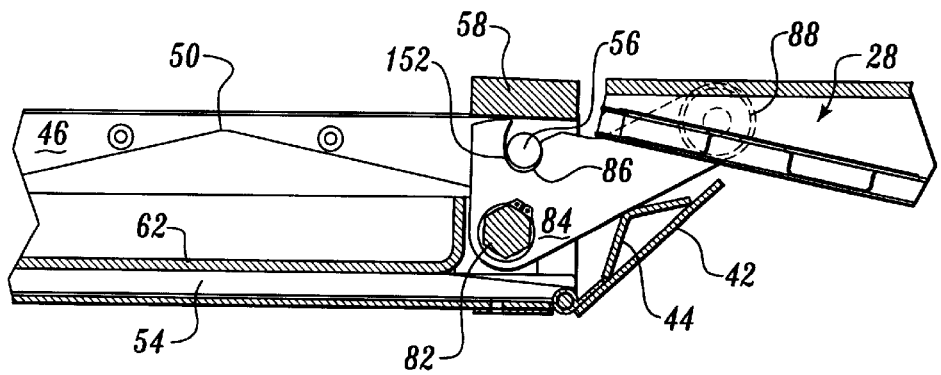
FIG. 18 is a partial sectional view similar to FIG. 8, with the ramp platform ¼ inch retracted.

As the ramp platform 28 approaches the last few inches of the deployment, the circular bearings 88 extend beyond the ends of the guide bars 46 and the bottom flange support bearings 54 (FIG. 15). By this time, the beveled leading edge 114 of the ramp platform 28 is resting on the ground. After a little more advancement of the ramp platform 28, the curved slots 86 on each of the lever arms 84 engage the pins 56 (FIG. 16). The pins 56 act as abutment surfaces for engaging and rotating the lever arms 84. The engagement of the curved slots 86 with the pins 56 stops advancement of the top portions of the lever arms 84, causing the lever arms to rotate about the torque shaft 82. As is shown sequentially in FIGS. 17, 18, and 8, the lever arms 84 continue to rotate, lifting the trailing end of the ramp platform 28 upward until the trailing end of the ramp platform is aligned with the upper cross-member 58.

During the final advancement of the ramp platform 28, the lever arms 84 contact the V-shaped brackets 44 on the hinged closure panel 42, causing the hinged closure panel to pivot downward clear of the underside of the deployed ramp platform 28. In addition, the leading edges of the bearing strips 64 are captured between the forward juncture 52 of the guide bars 46 and the bottom flange support bearings 54. This capturing adds stability to the fully-deployed ramp platform 28. When the ramp platform is fully deployed, the latch arms 122, 124 lock onto the deployed latch plates 146, 148.

The curved slots 86 are toleranced to influence control of the pivot of the lever arms 84 during travel. Specifically, the curved slots 86 and the lever arms 84 are arranged so that the trailing end of the ramp platform 28 moves substantially straight upward and downward after the bearings 88 have extended beyond the end of the guide bars. During this movement, concave rear surfaces 152 of the curved slots 86 move along the pins 56. This movement helps in retracting the ramp platform 28, because it forces the lever arms 84 to pivot downward and not rely on gravity. The torque shaft 82 provides continuity from one lever arm 84 to the other should non-uniform loads be applied to the ramp platform 28.

As can be best seen in FIG. 6, the serpentine profile of the guide rail 46 and the substantially straight configuration of the bottom flange support bearings 54 creates a gap 154 between the guide rail and the bottom flange support bearings underneath the peak 50. The gap 154 permits free movement of the circular bearings 88 between the guide rail 46 and the bottom flange support bearings 54. This freedom of movement of the circular bearings 88 permits the ramp platform 28 to extend in a variety of different angles relative to the rectangular enclosure 24, allowing the ramp platform 28 to be deployed onto surfaces having varying heights. If the leading end of the ramp platform 28 comes into contact with the ground, the weight of the ramp platform no longer cantilevers the circular bearings 88 into contact with the guide rail 46. Instead, the circular bearings 88 lower toward the bottom flange support bearings 54 and the ramp platform 28 continues to extend, with the leading edge of the ramp platform dragging on the ground, until the ramp platform is fully extended. In this manner, the ramp platform 28 can be deployed onto different surfaces having varying heights.

As is best shown in FIG. 5, a limit switch 160 is located on the rectangular motor plate between the solenoids 144 and the electrical motor 72. The limit switch 160 includes an arm 162 that engages a first stop 164 (near the upper cross member 58, FIG. 3) upon full deployment of the ramp platform 28, and a second stop 166 (adjacent the end panel 36, FIG. 4) upon full retraction of the ramp platform 28. The limit switch 160 signals the control logic system for the ramp assembly 20 that the ramp platform is in the fully stowed or fully deployed positions. Once the ramp platform 28 is in either position, power is disconnected from the electrical motor 72.

To retract the ramp platform 28, the driver actuates a "stow" button (not shown), which causes the solenoids 144 to actuate and release the latch arms 122, 124 from the deployed latch plates 146, 148. Then, the electric motor 72 is powered causing the drive pulley 76 to rotate. Rotation of the drive pulley 76 causes the drive pulley to move along the drive belt 80, causing the rectangular motor plate 62 to move backward, rotating the lever arms 84, and thereby lowering the rearward end of the ramp platform 28. As described above, the front edge of the guide bars 46 include a sloped front edge 53 so as to direct the circular bearings 88 to between the guide bar and the bottom flange support bearing 54. The tapered leading edge 55 of the bottom flange support bearings 54 also helps to guide the circular bearings 88 into the cam slots formed by the guide bars 46 and the bottom flange support bearings 54.

Once the pins 56 are released from the curved slots 86 of the lever arms 84, the lever arms 84 cease rotation, and the ramp platform 28 begins retraction. As the ramp platform 28 is retracted, the circular bearings 88 once again engage the lower surfaces of the guide bars 46, and move along the serpentine path of the guide bars until at least half of the ramp platform 28 is within the rectangular enclosure 24, and the weight of the ramp platform is upon the bottom flange support bearings 54. During this movement, the rectangular motor plate 62 continues to retract and pull the ramp platform 28 toward the rear portion of the rectangular enclosure 24. The latch arm 124 eventually engages and rolls over the stowed latch plate 156, and locks in place. The limit switch 160 is engaged by the stop 166, and power is cut to the electrical motor 72. At the end of the retraction of the ramp platform 28, the hinged closure panel 42 closes. The stowed ramp platform 28 is now ready for travel.

On occasions when electrical power to the ramp assembly 20 should fail, a manual unlatching mechanism 180 enables the operator to release the ramp platform 28 from the deployed or stowed positions. The operator may then push the ramp platform 28 rearward to stow it in the rectangular enclosure 24. Alternatively, if electrical power is unavailable, a mechanic may operate the manual unlatching mechanism 180 to release the ramp platform 28 in order to physically extend the ramp platform for servicing.

The manual unlatching mechanism 180 (FIG. 19) includes a cam lever 182 located adjacent to and between the deployed latch plates 146, 148. The cam lever 182 is pivotally attached at one end to a pin 183 that is fixed to the bottom panel 38. The opposite end of the cam lever 182 includes a convex surface 181.

Figure 24:
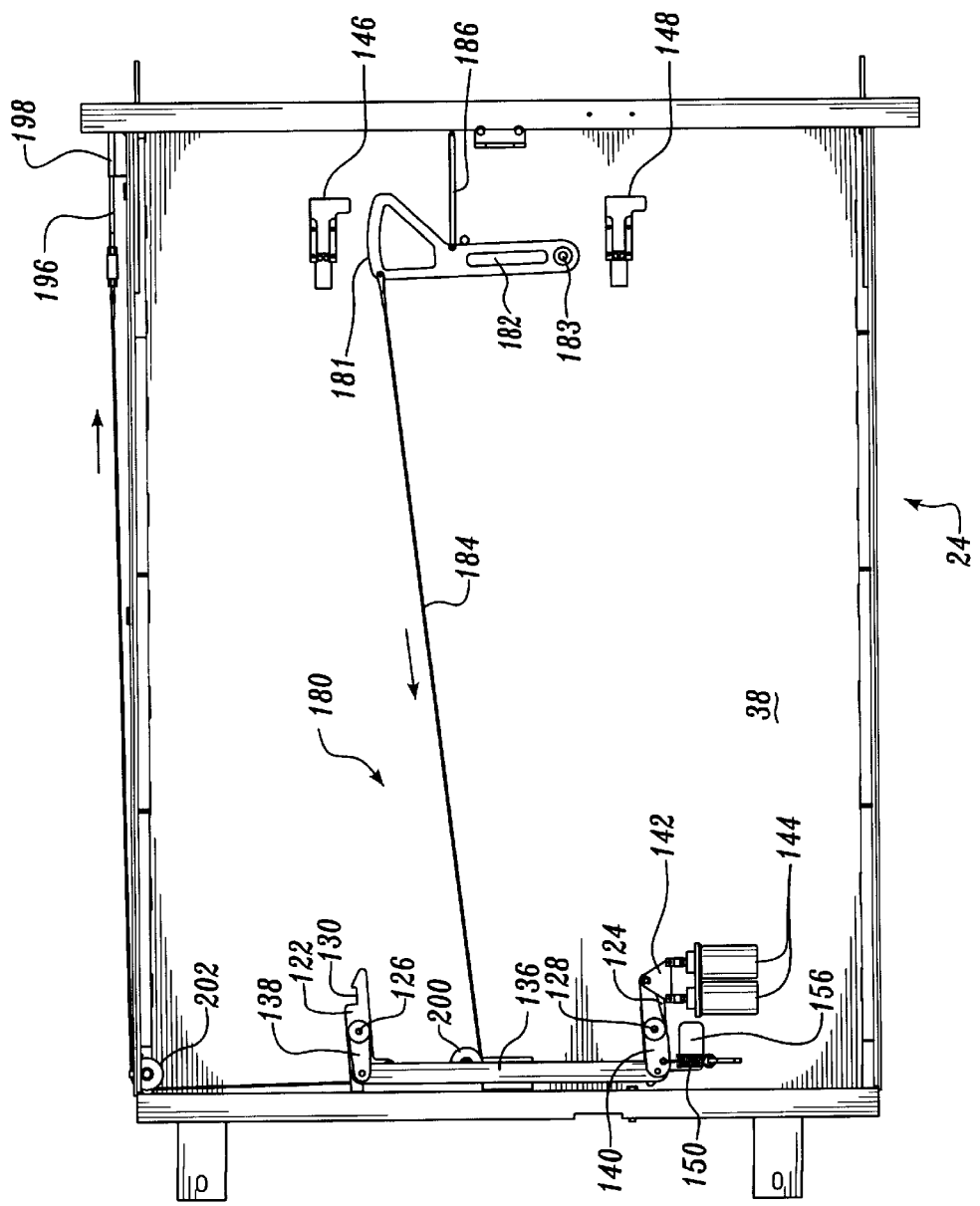
FIG. 24 is a top plan view similar to FIG. 19, with the ramp assembly in the stowed position.

A wire cable 184 is attached to the rear end of the cam lever 182. The forward end of the cam lever 182 is attached to an extension spring 186 (FIG. 24). The wire cable 184 is attached at an opposite end to a T-handle 194 (FIG. 2) having a threaded rod 196. The threaded rod 196 (FIG. 19) is inserted through and supported by a guide tube 198 attached to the rectangular enclosure 24. The guide tube 198 also limits the full stroke of the T-handle 194 by its length. The wire cable 184 extends rearwardly from the cam lever 182 along the top surface of the bottom panel 38 and wraps around a wire rope pulley 200 located at the end panel 36 adjacent the structural channel 60. From the wire rope pulley 200, the wire cable 184 extends along the rearward interior of the rectangular enclosure 24 to a second wire rope pulley 202 that extends partly through an opening in the rearward portion of the side panel 34. At the second wire rope pulley 202, the wire cable 184 exits the rectangular enclosure 24 and extends toward the forward end of the rectangular enclosure terminating at the threaded rod 196.

The wire cable 184 includes a wire rope ball shank 204 swaged to the wire cable along the rearward interior of the rectangular enclosure, between the two wire cable pulleys 200, 202, adjacent to the location where the latch arm 122 extends when the ramp platform 28 is in the stowed position. The latch arm 122 includes a V-notch 208 at its rearward end which is designed to capture the wire cable 184 when the ramp platform 28 is retracted to the stowed position.

Figure 25:
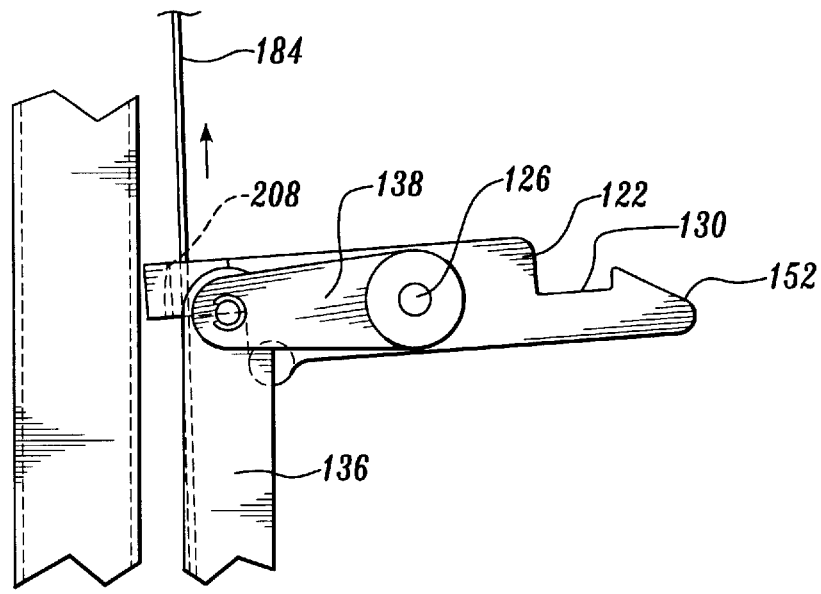
FIG. 25 is a detail view of the first latch arm of FIG. 24.
Figure 26:
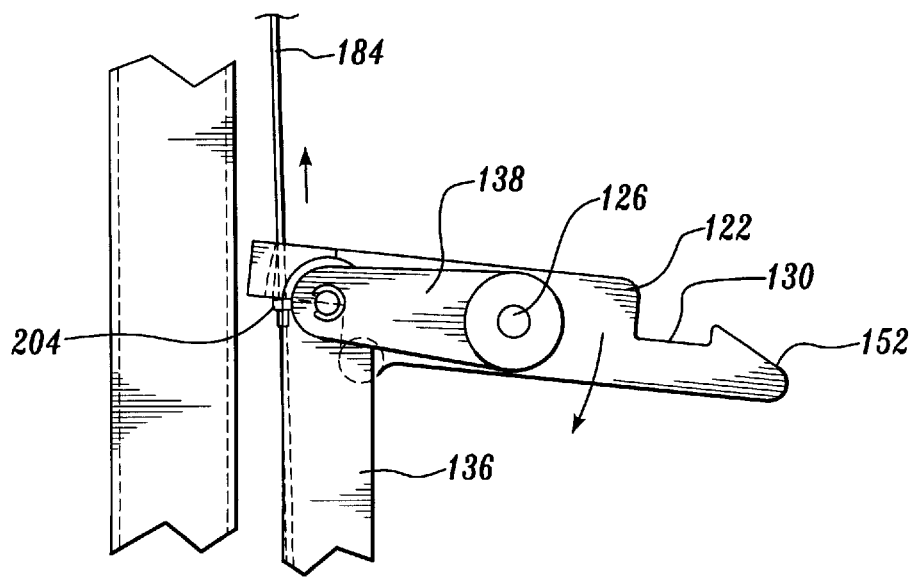
FIG. 26 is a detail view of the first latch arm of FIG. 25, with the latch arm manually actuated.
Figure 27:
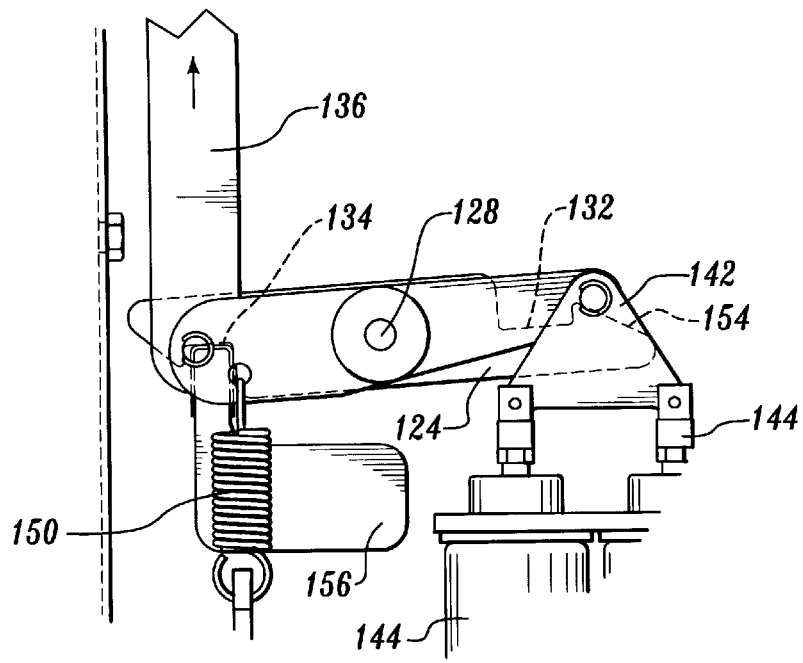
FIG. 27 is a detail view of the second latch arm of FIG. 24.
Figure 28:
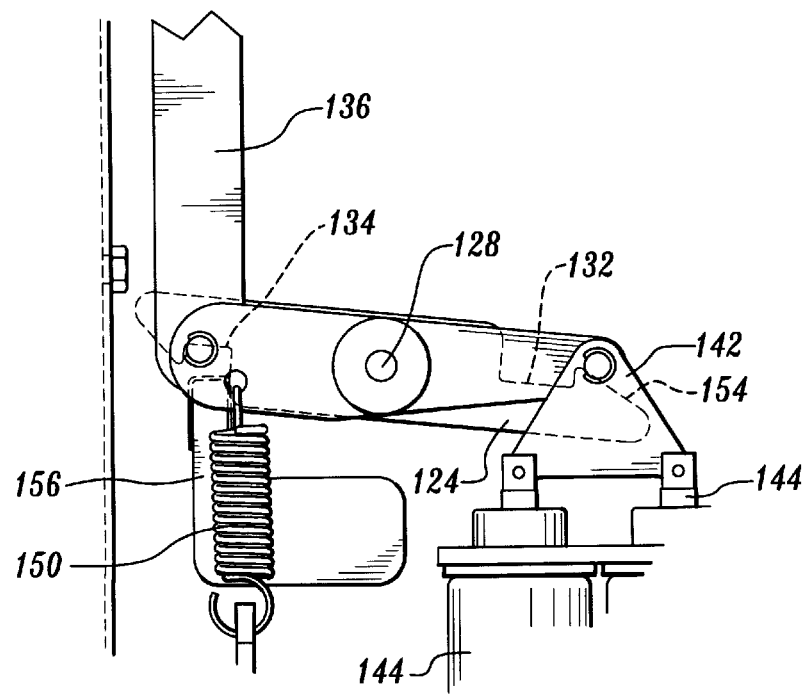
FIG. 28 is a detail view of the second latch arm of FIG. 25, with the latch arm manually actuated.

When the ramp platform is in the stowed position, the wire cable 184 extends through the V-notch 208 in the rear portion of the latch arm 122 (FIG. 25). If power is cut to the ramp assembly 20, the T-handle 194 can be pulled to operate the manual unlatching mechanism 180. When the T-handle 194 is pulled, the wire cable extends along the V-notch 208 until the wire rope ball shank 204 engages the rearward end of the latch arm 122, and causes the latch arm 122 (FIG. 26), as well as the second latch arm 124 (FIG. 28) to rotate. Rotation of the second latch arm 124 causes the cutout 134 to release from the stowed latch plate 156, and the ramp platform 28 is released. The ramp platform can then be manually withdrawn.

When the ramp platform 28 is fully deployed and power is cut to the ramp assembly 20, the manual unlatching mechanism 180 can be operated so as to release the ramp platform 28 so that it can be manually retracted. The rear end of the latch arm 122 includes a protrusion 210 (FIG. 20). This protrusion 210 is engaged by the camming surface 181 of the cam lever 182 when the ramp platform 28 is fully deployed and the T-handle 194 is pulled. Engagement of the protrusion 210 by the cam lever 182 causes the latch arm 122, as well as the latch arm 124, to rotate and release the deployed latch plates 146, 148 (FIGS. 21 and 23). In this manner, the manual unlatching mechanism 180 unlocks the ramp platform 28 and permits manual retraction of the ramp platform.

A disconnect coupling or clutch (not shown) can be coupled between the electrical motor 72 and drive shaft 74 to allow selective release of the drive pulley from the electrical motor 72, which would ease manual extension or retraction of the ramp mechanism. In addition, anti-friction bearings (not shown) at the shafts for the drive pulley 76 and idler pulleys 78 could reduce the force required to manually extend or retract the ramp platform 28. Finally, the drive belt 80 could be loosened or removed to reduce resistance to manual retraction or extension of the ramp platform 28.

The ramp assembly 20 of the present invention provides several advantages over prior art ramps. The lever arms 84 and pins 56 provide a mechanism by which the ramp platform 28 can be extended and the trailing end of the platform can be lifted, all in one translational movement. Thus, additional motors or mechanisms are not needed to lift the rear trailing end of the ramp platform 28. In addition, a transitional plate or other mechanism is not needed to provide a smooth transition between the ramp platform and the floor of the low-floor bus 22.

The present invention also provides the convenient reciprocating mechanism 26 that includes an electric motor 72 that is mounted for reciprocating motion with the ramp platform 28. This design saves space, and does not require a mounting structure for a motor underneath or behind the rectangular enclosure 24. The coiled electrical cable 90 permits accessible electrical power for the electric motor 72 and other components on the rectangular motor plate 62. Although the power supplied is disclosed as an electric motor 72, it is to be understood that hydraulic and other power sources could be used.

The ramp assembly 20 of the present invention also provides the manual unlatching mechanism 180, which permits manual release of the ramp platform 28 at the fully extended or retracted positions. The ramp platform 28 can then be manually extended or retracted.

While the preferred embodiment of the invention has been illustrated and described with reference to preferred embodiments thereof, it will be appreciated that various changes can be made therein without departing from the spirit and scope of the invention as defined in the appended claims.

The embodiments of the invention in which an exclusive property or privilege is claimed are defined as follows:

1. A ramp assembly for mounting on a vehicle, comprising:
    a frame for mounting below a floor of a vehicle;
    a ramp platform mounted in the frame and defining trailing and forward ends;
    a reciprocating mechanism for extending and retracting the ramp platform along a length of the frame between stowed and deployed positions, the ramp platform being stowed substantially along a plane, and being arranged when deployed such that the forward end extends down toward the ground; and
    means connected to the reciprocating mechanism for raising the trailing end of the ramp platform in one translational movement with the extension of the ramp platform, such that the trailing end of the ramp platform, when deployed, is raised above the plane, wherein the means for raising comprises a lever having a distal end attached to the trailing end of the ramp platform and a second end rotatably attached to the reciprocating mechanism, the lever configured to rotate about the second end as the reciprocating mechanism is extended, thereby lifting the trailing end of the ramp platform upward, wherein the frame comprises an abutment surface that is engaged by the lever when the ramp platform is extended, the engagement of the abutment surface by the lever causing the lever to rotate.

2. The ramp assembly of claim 1, wherein the abutment surface is a pin, and wherein the lever comprises a slot which is configured to receive the pin upon extension of the ramp platform.

3. The ramp assembly of claim 2, wherein the slot is curved, whereby the curved slot causes a smooth translational lifting movement of the trailing end of the ramp platform.

4. The ramp assembly of claim 1, wherein the frame comprises a cam slot and wherein the lever comprises a cam follower, the cam slot and the cam follower being configured such that during extension of the ramp platform, the cam follower follows the cam slot during at least part of the extension, and wherein the lever engages the abutment surface and the cam follower continues forward in an arc having a center at the abutment surface, such that the lever is rotated to lift the trailing end of the ramp platform.

5. The ramp assembly of claim 4, wherein the cam follower extends beyond the cam slot during movement along the arc.

6. The ramp assembly of claim 1, wherein the frame comprises a cam slot and the lever comprises a cam follower, the cam slot and the cam follower being configured such that during extension of the ramp platform, the cam follower follows the cam slot during at least part of the extension, and wherein the lever is rotated along an arc at an end of extension so as to extend out of the cam slot such that the lever lifts the trailing end of the ramp platform.

7. The ramp assembly of claim 1, wherein the reciprocating mechanism comprises a motor, and wherein the motor is mounted for reciprocating movement with the ramp platform.

8. The ramp assembly of claim 7, further comprising
    a rod extending the length of the frame; and
    a power cord for supplying power to the motor, the power cord being coiled around the rod and being attached at one end to the frame and at another end to the reciprocating mechanism.

9. A ramp assembly for mounting on a vehicle, comprising:
    a frame for mounting below a floor of a vehicle, wherein the frame comprises a cam slot;
    a ramp platform mounted in the frame and defining trailing and forward ends;
    a reciprocating mechanism for extending and retracting the ramp platform along a length of the frame between stowed and deployed positions, the ramp platform being stowed substantially along a plane, and being arranged when deployed such that the forward end extends down toward the ground; and
    a lever having a distal end attached to the trailing end of the ramp platform and a second end rotatably attached to the reciprocating mechanism, the lever configured to rotate about the second end as the reciprocating mechanism is extended, thereby lifting the trailing end upward, wherein the lever comprises a cam follower, the cam slot and the cam follower being configured such that during extension of the ramp platform, the cam follower follows the cam slot during at least part of the extension.

10. The ramp assembly of claim 9, wherein the frame comprises an abutment surface that is engaged by the lever when the ramp platform is extended, the engagement of the abutment surface by the lever causing the lever to rotate.

11. The ramp assembly of claim 10, wherein the abutment surface is a pin, and wherein the lever comprises a slot which is configured to receive the pin upon extension of the ramp platform.

12. The ramp assembly of claim 11, wherein the slot is curved, whereby the curved slot causes a smooth translational lifting movement of the trailing end.

13. The ramp assembly of claim 11, wherein the lever engages the abutment surface and the cam follower continues forward in an arc having a center at the abutment surface, such that the lever is rotated to lift the trailing end of the ramp platform.

14. The ramp assembly of claim 12, wherein the cam follower extends beyond the cam slot during movement along the arc.

15. The ramp assembly of claim 9, wherein the lever is rotated along an arc at the end of extension so as to extend out of the cam slot such that the lever lifts the trailing end of the ramp platform.

16. The ramp assembly of claim 9, wherein the reciprocating mechanism comprises a motor, and wherein the motor is mounted for reciprocating movement with the ramp platform.

17. The ramp assembly of claim 16, further comprising
a rod extending the length of the frame; and
a power cord for supplying power to the motor, the power cord being coiled around the rod and being attached at one end to the frame and at another end to the reciprocating mechanism.

18. A ramp assembly comprising:
a frame for mounting below a floor of a vehicle and a defining front, bottom cantilevering surface;
a ramp platform mounted in the frame and defining trailing and forward ends;
a cam follower fixed to the trailing end of the ramp platform;
a reciprocating mechanism for extending and retracting the ramp platform along a length of the frame between stowed and deployed positions, the ramp platform being stowed substantially along a plane, and being arranged when deployed such that the forward end extends down toward the ground;
a cam slot extending along the frame and having top and bottom guiding surfaces, the cam slot and the cam follower being configured such that during extension of the ramp platform, the cam follower follows the cam slot and the cam follower presses against the top guiding surface at a section that corresponds with the weight of the forward end of the ramp platform extending beyond the cantilevering surface a sufficient amount to cantilever the trailing end of the ramp platform upward relative to the frame;
the top guiding surface being spaced from the bottom guiding surface such that the cam follower is permitted free movement between the top and bottom guiding surfaces when the cam follower is within the section;
a lever having a distal end attached to the trailing end of the ramp platform and a second end rotatably attached to the reciprocating mechanism, the lever configured to rotate about the second end as the reciprocating mechanism is extended, thereby lifting the trailing end upward; and
an abutment surface that is engaged by the lever when the ramp platform is extended, the engagement of the abutment surface by the lever causing the lever to rotate.

19. The ramp assembly of claim 9, wherein the frame comprises a cam slot and wherein the lever comprises a cam follower, the cam slot and the cam follower being configured such that during extension of the ramp platform, the cam follower follows the cam slot during at least part of the extension, and wherein the lever engages the abutment surface and the cam follower continues forward in an arc having a center at the abutment surface, such that the lever is rotated to lift the trailing end of the ramp platform.

20. The ramp assembly of claim 19, the cam follower extends beyond the cam slot during movement along the arc.

21. A ramp assembly comprising:
a frame for mounting below a floor of a vehicle and defining a front, bottom cantilevering surface;
a ramp platform mounted in the frame and defining trailing and forward ends;
a reciprocating mechanism for extending and retracting the ramp platform along a length of the frame between stowed and deployed positions, the ramp platform being stowed substantially along a plane, and being arranged when deployed such that the forward end extends down toward the ground;
a lever having a distal end attached to the trailing end of the ramp platform and a second end rotatably attached to the reciprocating mechanism, the lever comprising a cam follower; and
a cam slot extending along the frame and having top and bottom guiding surfaces, the cam slot and the cam follower being configured such that during extension of the ramp platform, the cam follower follows the cam slot and the cam follower presses against the top guiding surface at a section that corresponds with the weight of the forward end of the ramp platform extending beyond the cantilevering surface a sufficient amount to cantilever the trailing end of the ramp platform upward relative to the frame;
the top guiding surface being spaced from the bottom guiding surface such that the cam follower is permitted free movement between the top and bottom guiding surfaces when the cam follower is within the section.

22. The ramp assembly of claim 21, wherein the lever is configured to rotate about the second end as the reciprocating mechanism is extended, thereby lifting the trailing end upward.

23. The ramp assembly of claim 21, further comprising an abutment surface that is engaged by the lever when the ramp platform is extended, the engagement of the abutment surface by the lever causing the lever to rotate.

24. The ramp assembly of claim 23, wherein the frame comprises a cam slot, the cam slot and the cam follower being configured such that during extension of the ramp platform, the cam follower follows the cam slot during at least part of the extension, and wherein the lever engages the abutment surface and the cam follower continues forward in an arc having a center at the abutment surface, such that the lever is rotated to lift the trailing end of the ramp platform.

25. The ramp assembly of claim 24, wherein the cam follower extends beyond the cam slot during movement along the arc.

* * * * *

UNITED STATES PATENT AND TRADEMARK OFFICE
CERTIFICATE OF CORRECTION

PATENT NO. : 6,186,733 B1  
DATED : February 13, 2001  
INVENTOR(S) : C.A. Lewis et al.

It is certified that error appears in the above-identified patent and that said Letters Patent is hereby corrected as shown below:

Column 14,
Line 63, "claim 12," should read -- claim 13, --

Column 15,
Line 52, "claim 9," should read -- claim 18, --

Signed and Sealed this

Fourteenth Day of August, 2001

*Attest:*

*Attesting Officer*

NICHOLAS P. GODICI
*Acting Director of the United States Patent and Trademark Office*